United States Patent [19]

Tomlinson et al.

[11] Patent Number: 4,733,987

[45] Date of Patent: Mar. 29, 1988

[54] SPRING CLIP

[76] Inventors: Peter N. Tomlinson, 315 Endford Road, Mondeo, Johannesburg, Transvaal; Klaus Tank, 9 Warbleton Avenue, Essexwold, Johannesburg, Transvaal, both of South Africa

[21] Appl. No.: 13,348

[22] Filed: Feb. 11, 1987

[30] Foreign Application Priority Data

Feb. 27, 1986 [ZA] South Africa ................. 86/1471

[51] Int. Cl.⁴ .................... B25G 3/18; F16B 21/00
[52] U.S. Cl. ................... 403/326; 403/155; 285/305; 411/522
[58] Field of Search ............ 403/326, DIG. 7, 155; 411/517, 522, 530, 353; 285/305, 321

[56] References Cited

U.S. PATENT DOCUMENTS 2,530,083  11/1950  Ruch ..................... 411/530
3,270,124  8/1966  Rawls et al. ........... 403/155 X

FOREIGN PATENT DOCUMENTS 2101978  8/1972  Fed. Rep. of Germany ...... 411/522
287753   3/1928  United Kingdom ............ 411/522
372584   5/1932  United Kingdom .
658407  10/1951  United Kingdom .
752758   9/1956  United Kingdom .
851128  10/1960  United Kingdom .
1296872 11/1972  United Kingdom .
2002081  2/1979  United Kingdom .
1543104  3/1979  United Kingdom .

Primary Examiner—Andrew V. Kundrat
Attorney, Agent, or Firm—Scully, Scott, Murphy & Presser

[57] ABSTRACT

A spring clip which is used to secure the shank of a cutting pick to a pick box or cutting drum in a mining machine. The clip is formed of spring steel and has spaced legs joined by a bight portion. Associated with the bight portion is a bearing part which bears upon the shank of the cutting pick when the clip has been aligned with the shank and has been forced transversely to the shank so that the shank is received between the legs.

2 Claims, 2 Drawing Figures ized with the numeral 10. It is formed of spring steel wire and has spaced legs 12 joined together by a bight portion 14. Towards their free ends, the legs 12 are
SPRING CLIP

BACKGROUND TO THE INVENTION

This invention relates to a spring clip which is used to secure the shank of a cutter pick to the drum of a mining machine.

The spring clips which are currently used for this purpose have basically a U-shape with spaced legs and a bight portion adjoining the two legs. The extreme ends of the legs are outwardly splayed and there is an outward bulge midway along each leg. In use, the clip is applied to a grooved portion towards the end of the shank, the diameter of the grooved portion being slightly greater than the clear spacing between the outward bulges in the legs. This is achieved by aligning the clip with the grooved portion and hammering it in a direction transverse to the shank of the pick so that the legs are forced apart and the grooved portion is received between the bulges. When this situation is reached, the bight portion is still spaced from the grooved portion with the result that further hammer blows cause further outward splaying of the legs and possible deformation of the clip so that it no longer serves a securing function.

The present invention seeks to provide a spring clip which will solve this problem.

SUMMARY OF THE INVENTION

A spring clip according to this invention comprises a length of spring wire which has two spaced legs and a bight portion adjoining those legs, the legs being shaped to receive and retain the shank of a cutting pick between them when the clip is aligned with shank and is forced in direction transverse to the shank, wherein there are bearing means associated with the bight portion of the clip which protrude inwardly between the legs to bear upon the shank when the shank is correctly received between the legs.

In a preferred form of the invention, the bight portion itself defines inwardly protruding bearing means. However, other forms of the invention may have inwardly protruding bearing means defined by a separate part attached to the bight portion.

DESCRIPTION OF AN EMBODIMENT

Figure 1:
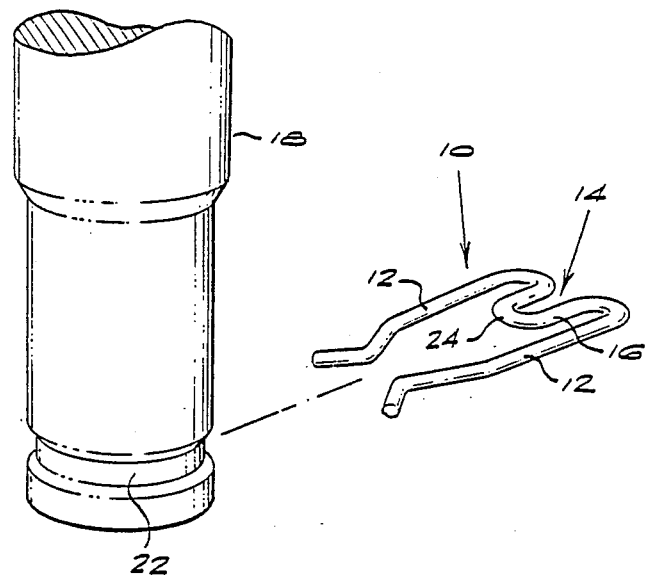
FIG. 1 shows a clip according to the invention before installation.

In FIG. 1, a clip according to the invention is designated with the numeral 10. It is formed of spring steel wire and has spaced legs 12 joined together by a bight portion 14. Towards their free ends, the legs 12 are deformed inwardly with their extreme ends being outwardly splayed as shown. The bight portion 14 has a re-entrant part 16 which protrudes inwardly between the legs 12.

In order to secure the shank 18 of a cutter pick to a retaining box (not shown), the shank is inserted into the box and the illustrated clip is fitted to the shank in an annular groove 22 at the inner end of the shank which is inside the box. This is achieved by aligning the free ends of the legs 12 with the groove and hammering on the bight portion to move the clip in a direction transverse to the shank. When this is done, the legs move apart from one another to receive the shank between them.

When the clip is fully home, the inner end 24 of the part 16 bears upon the base of the groove to prevent further transverse movement of the clip relative to the shank. Thus further hammer blows applied to the bight portion will not result in further splaying of the legs and the shank remains securely engaged by the clip.

Figure 2:
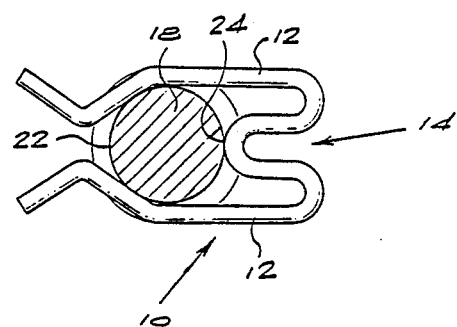
FIG. 2 shows how the clip operates in a cross-sectional view.

Note in FIG. 2 that the shank is a snug fit between the inner end 24 of the part 16 and the inwardly deformed portions of the legs 12.

We claim:

1. A spring clip for engaging a grooved section in the shank of a cutter pick and for securing said cutter pick to a mining machine drum, the spring clip being constructed of spring steel wire and comprising:

a first leg and a second leg parallel to and spaced from each other, such that a constant spacing between said legs is provided along a substantial length of said legs; and a bight portion integral with and extending between said first and second legs to connect said legs together;

wherein said first and second legs are provided with end portions remote from said bight portion which are outwardly splayed, and intermediate portions of a length substantially equal thereto located between said end portions and said bight portion which are inwardly directed and in opposition to each other such that a spacing between said inwardly directed intermediate portions of said legs is less than the constant spacing between said legs where said legs are spaced in parallel arrangement; and wherein said bight portion includes a generally U-shaped re-entrant bearing portion extending in the same direction as said parallel-spaced legs and terminating at a point between said bight portion and said intermediate portions.

2. A spring clip according to claim 1 wherein said bearing portion prevents further advancement of said clip in the groove when seated on the shank.

* * * * *